Patented July 24, 1951

2,561,565

UNITED STATES PATENT OFFICE 2,561,565

PROCESS OF FLUXING AND JOINING METAL PARTS

Alden P. Edson, Hartford, and Isaac L. Newell, Wethersfield, Conn., assignors to United Aircraft Corporation, East Hartford, Conn., a corporation of Delaware No Drawing. Application June 22, 1946, Serial No. 678,682

10 Claims. (Cl. 113—112)

The present invention relates to the joining of metal parts by means of solder, and more particularly to fluxing of the metals to be joined. The term solder as used herein includes not only the metals and alloys such as those of lead and tin which melt below 1000° F., but also metals and alloys of melting temperatures higher than 1000° F. such as the class of materials commonly known as silver solders and brazing metals. In like manner, our term soldering is used in the broader sense and includes such operations as silver soldering, brazing, welding, and sintering.

Objects and advantages of the invention will be set forth in part hereinafter and in part will be obvious herefrom, or may be learned by practice with the invention, the same being realized and attained by means of the processes and compositions pointed out in the appended claims.

The invention consists in the novel processes and compositions herein shown and described.

The art of joining metals together by such operations as brazing, welding, soldering and the like has heretofore employed as fluxes compounds which remain after the joining operation. These fluxes are often difficult to remove from the metals either due to insolubility in the solvent employed or due to the geometry of the assembly. They are usually highly corrosive in the presence of moisture and may eventually lead to premature failure of the metal or the bond and may interfere with the function or appearance of the parts joined. They may also interfere with paint adhesion, electroplating and other methods of finishing or protecting the surface of metals. Some of the most widely used fluxes for the joining of metals have employed salts of fluorine and boron which are liquid at the temperature of joining. The action of these fluxes is as follows:

1. To react with and dissolve metallic oxides, sulfides, and other corrosion products present on the surface of the metals.

2. To spread over, wet and cover the surface of the metal, thus preventing oxidation of the metal.

3. To lower the interfacial tension between the metals being joined and the alloy being used for soldering or brazing.

An object of this invention is to provide a process wherein materials are used which are not objectionable from the standpoint of etching, corrosion, or residual flux on the parts being joined, and yet actively flux the metal parts being joined so that high strength bonds are obtained.

Compounds containing fluorine as a component element, and particularly the fluorine salts, liquid or solid at normal temperatures and pressures (70° F. and 760 mm.), and having substantial volatility at the temperature of brazing, give good fluxing action when incorporated into a stable non-oxidizing atmosphere.

Of the fluorine compounds liquid or solid at normal temperatures and pressures and completely gaseous at the metal joining temperature, those whose molecules consist in part of an ammonium radical are especially suitable for incorporation into a stable non-oxidizing atmosphere for use as a flux. Of this latter group ammonium fluoborate performs exceptionally well.

Other typical compounds used are ammonium bifluoride, ammonium fluoborate, ammonium polyfluorides, stannic tetrafluoride, ammonium fluosilicate, titanium tetrafluoride, and zirconium tetrafluoride.

By "stable non-oxidizing atmosphere" is meant a gas without detrimental action on the metals employed. For example, if the metals used are straight carbon steel, then an atmosphere of pure dry nitrogen would be suitable as a carrier for the fluorine compound. If the metal used would react with nitrogen, then an atmosphere of pure dry helium would be satisfactory as a carrier gas. In the case of fluorine compounds which are completely gaseous at the temperature of brazing, the stable non-oxidizing atmosphere may consist wholly of the fluorine compound.

Excellent joints can be obtained between metal parts with a variety of alloys, viz: silver, copper, silver-copper, copper-manganese, copper-nickel, copper-nickel-manganese, silver-copper-zinc, silver-copper-zinc-nickel, silver-copper-zinc-cadmium, silver-cadmium-nickel, copper-tin, silver-copper-zinc-tin, and copper-zinc, when using the gaseous flux of the composition cited above. These, of course, do not represent all of the alloys which may be used for joining by this process but are given to show the wide range application of this flux. The activity of the flux increases with the temperature of joining and stronger joints are obtained at the higher temperatures. Tests which have been made up to temperatures of 2250° F. have been satisfactory and there is no apparent reason why even higher temperatures would not give even better fluxing action.

It is believed that the flux functions in the following manner:

1. It is substantially stable against and without detrimental action upon the metals present in the parts being joined or the solder.

2. It reacts with the contaminants present upon the parts being joined and the solder used in such fashion as to a. reduce them to the elemental metallic state, b. convert them into a compound of melting temperature lower than the temperature used for soldering, c. convert them into compounds having appreciable volatility at soldering temperature, which compounds may be dispersed in the fluxing atmosphere and exhausted with such atmosphere.

The strength of parts produced in practicing this invention is at least as high as that of parts formed by methods heretofore used. Moreover, no residue remains on the parts formed by this process when the parts are free from dirt and oxides prior to joining. In parts contaminated with oxides prior to joining, any residue from fluxing action is slight and proportional to the oxides originally present.

Example No. I

The shell interior and core exterior of a hollow steel propeller blade are mechanically and chemically cleaned according to conventional methods. A sheet of 0.010" thick A. S. T. M. #2 silver solder foil is laid over the core tip and extended along the face and camber sides of the core. The shell is then slid over this sub-assembly and is secured to the core by a gas-tight joint with a steel pipe extending into the leading and trailing edge cavities of the shell. Sufficient ammonium fluoborate is introduced into the tip of the shell volume to produce, at a temperature of 1650° F., not less than five times as much gas as the free shell volume. The assembly is then placed in a refractory alloy die and connections are made to the shell pipe lines and the shell is purged with ten volumes of dry oxygen-free nitrogen. A pressure of one pound per square inch of this gas is introduced into the shell volume, and a nitrogen pressure of sixteen pounds per square inch is introduced into the core volume. The shell volume is arranged to exhaust through a molten lead trap. The die and blade assembly are then placed in a furnace heated to 1650° F. and held in the furnace for sufficient time to permit satisfactory brazing. During the time in the furnace, no flow of gas into the shell is provided except such as may be necessary to maintain shell pressure of one pound per square inch.

Upon the completion of the brazing operation and prior to condensation of the ammonium fluoborate in the blade, and solidification of the molten lead in the lead trap, the shell volume is purged with not less than ten volumes of pure nitrogen. This produces a blade in which the shell and core are joined by a strong bond and in which there are no objectionable flux residues.

Example No. II

In joining interior surfaces, such as pipes in the interior of a tank, the parts to be joined are held in position mechanically with silver-solder foil placed between them. Ammonium fluoride is put in the interior of the tank is sufficient quantity to produce at least five volumes of vapor at the temperature to be used in joining. The tank is then closed with the exception of venthole and is heated by suitable means, such as furnace or salt bath. After the time required for the metal and brazing alloy to come to temperature, the heat is removed and the tank allowed to come to room temperature. The tank is purged with nitrogen or other non-oxidizing gas to remove the flux while in the vapor phase. No washing or cleaning action is required after the brazing operation.

It is to be understood that in the examples given above, the invention is not to be confined to the fluxes mentioned in those examples, but that they may be interchanged. Moreover, additional fluxes of the type mentioned heretofore, such as titanium tetrafluoride, zirconium tetrafluoride, ammonium fluosilicate and the like may be used. The metals which can be joined are not confined to those stated in the examples given above. Among those which have been actually joined are:

Phosphor bronze, fair braze
18–8 Stainless steel, good braze
Nickel, good braze
Beryllium copper, good braze
70–30 brass, good braze
Copper, good braze
Silver, good braze
An alloy comprising 67% nickel-33% copper, good braze
13 chrome stainless steel, good braze
Moly high speed steel, good braze
Tungsten, good braze
Gold, good braze
An alloy comprising 90% nickel-10% chromium, good braze
An alloy comprising 94% nickel-1% silicon-2% aluminum-0.5% iron-2.5% manganese, good braze
Carbon steel, good braze
Alloy steel, good braze These, of course, do not represent all of the groups which may be joined by this process, but are given to show the wide range of application of this flux.

The invention in its broader aspects is not limited to the specific processes and compositions described but departures may be made therefrom within the scope of the accompanying claims without departing from the principles of the invention and without sacrificing its chief advantages.

What is claimed is:

1. The process of joining metal parts by solder which comprises maintaining a stable gaseous atmosphere which is substantially inert at soldering temperatures with respect to the metals being treated, which stable gaseous atmosphere has as its active component a fluorine-containing compound which is reactive with the oxides of the metals and is non-gaseous at normal temperatures and pressures and is volatile below soldering temperature, and cleaning the metal parts and solder by subjecting them to said stable gaseous atmosphere at soldering temperature until the metal parts have been bonded by the solder.

2. A process as claimed in claim 1 in which the fluorine-containing compound contains at least one element capable of forming an oxide which is stable and volatile under soldering conditions.

3. A process as claimed in claim 2 in which the fluorine compound is purged from the solder and metals after soldering.

4. A process as claimed in claim 3 in which the fluorine-containing compound is a salt containing fluorine which is non-gaseous at normal temperatures and pressures and is volatile below soldering temperature.

5. A process as claimed in claim 1 in which the fluorine-containing compound contains at least one element capable of forming an oxide which is stable and liquid under soldering conditions.

6. A process as claimed in claim 1 in which the fluorine-containing compound is a fluorine-containing salt.

7. A process as claimed in claim 1 in which the fluorine compound is completely gaseous at soldering temperature and pressure.

8. A process as claimed in claim 1 in which the active component of the atmosphere is ammonium fluoborate.

9. A process as claimed in claim 1 in which the active component of the atmosphere is ammonium fluosilicate.

10. A process as claimed in claim 1 in which the active component of the atmosphere is ammonium fluoride.

ALDEN P. EDSON.
ISAAC L. NEWELL.

REFERENCES CITED

The following references are of record in the file of this patent:

UNITED STATES PATENTS

| Number | Name | Date |
|---|---|---|
| 1,536,944 | Steenstrup | May 5, 1925 |
| 2,157,918 | Rankin | May 9, 1939 |
| 2,166,109 | Karmazin | July 18, 1939 |
| 2,276,847 | Kelley | Mar. 17, 1942 |
| 2,286,298 | Miller | June 16, 1942 |
| 2,426,467 | Nelson | Aug. 26, 1947 |
| 2,438,721 | Spencer | Mar. 30, 1948 |

OTHER REFERENCES

"Amer. Mach."; Controlled Heat Treating Atmospheres—November 12, 1942.